May 12, 1959 P. J. WALLS 2,886,286
TRANSPORTABLE LIFTER
Filed Dec. 15, 1955 5 Sheets-Sheet 5

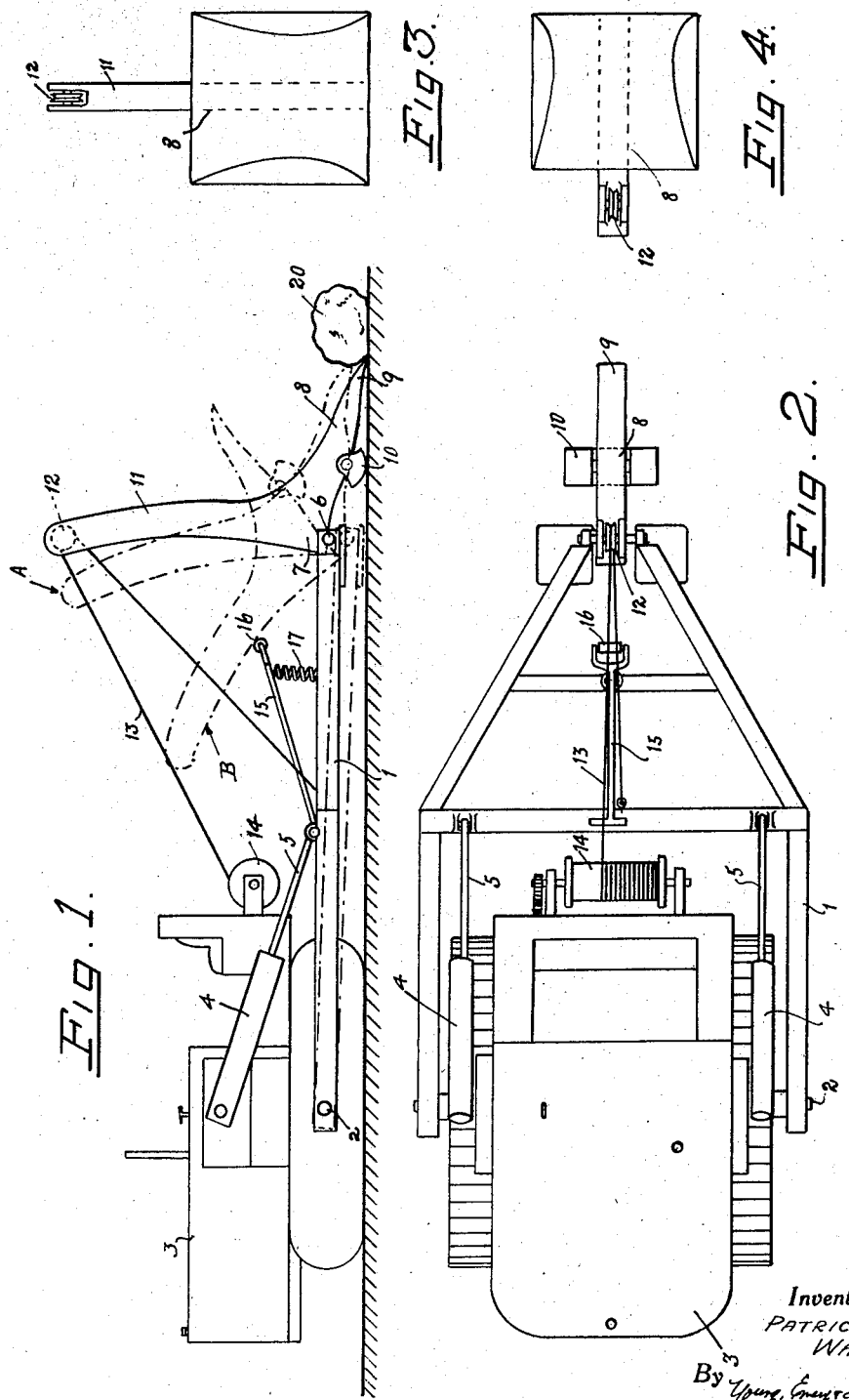

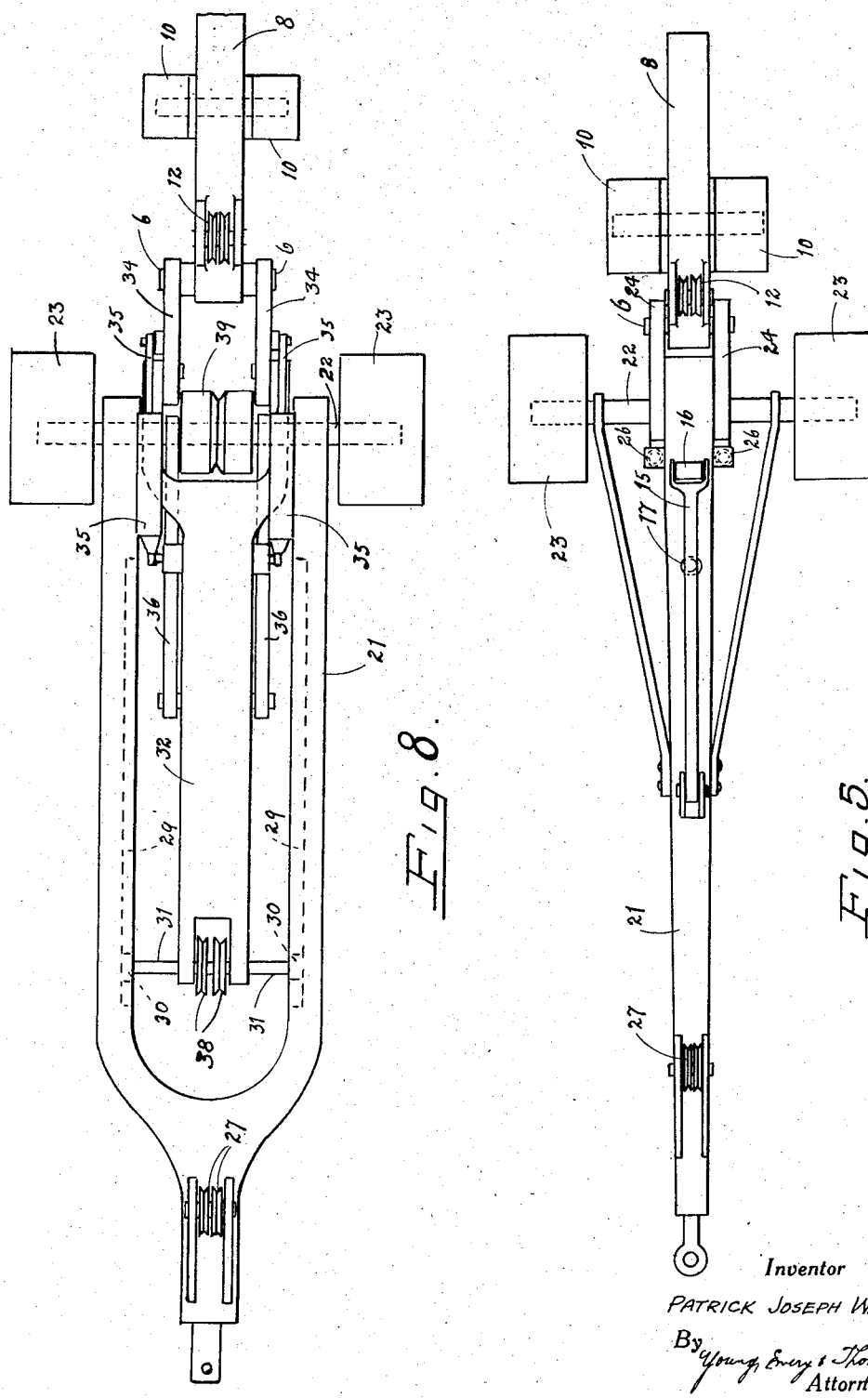

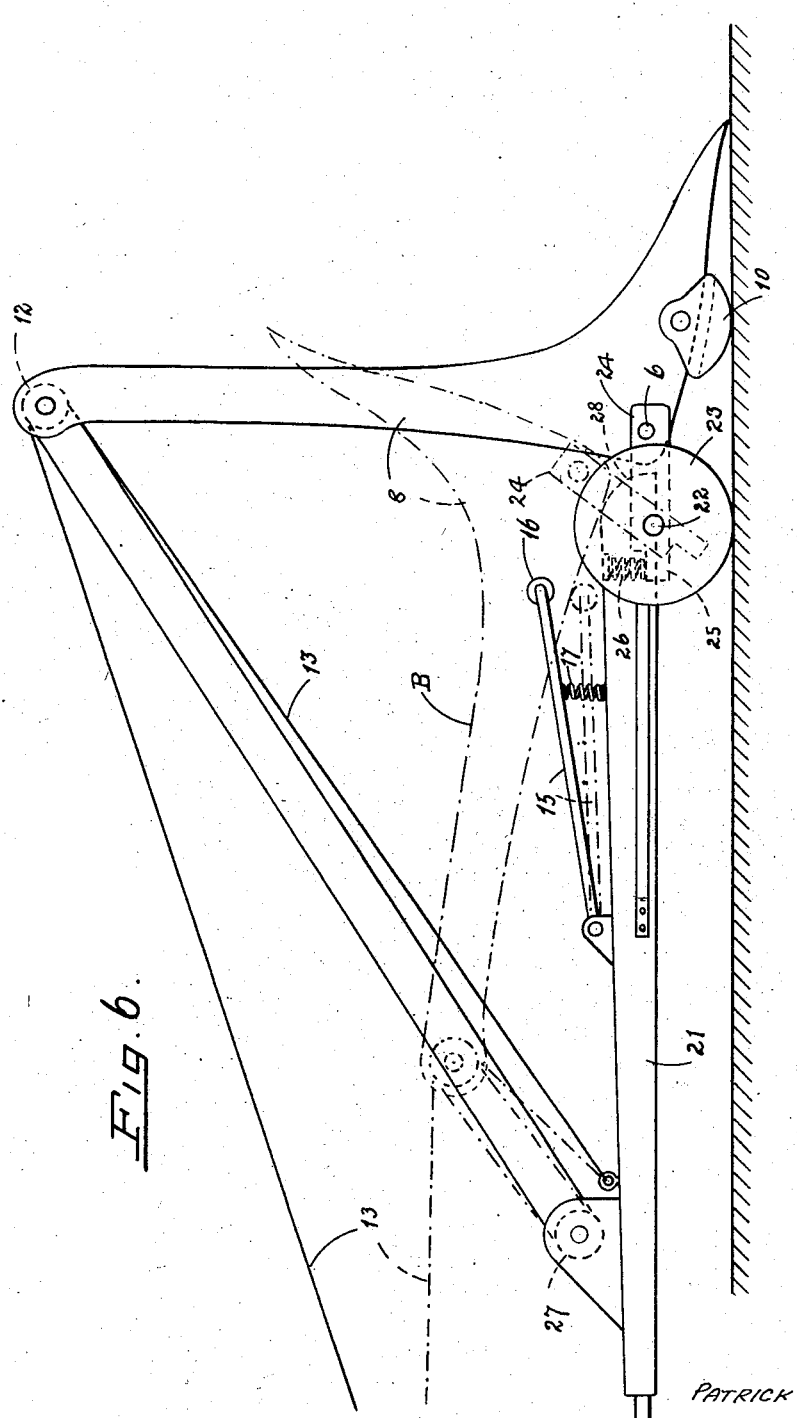

Inventor
PATRICK
JOSEPH WALLS
By
Young, Emey & Thompson
Attorneys

United States Patent Office 2,886,286
Patented May 12, 1959

2,886,286
TRANSPORTABLE LIFTER
Patrick J. Walls, Dublin, Ireland

Application December 15, 1955, Serial No. 553,344

Claims priority, application Ireland December 16, 1954

7 Claims. (Cl. 254—127)

This invention concerns lever devices for use in raising and transporting such objects as rocks, stumps of trees and other obstructions commonly met with in clearing ground for agriculture, building and the preparation of aircraft landing grounds and the like.

The object of the invention is to provide a device of relatively simple construction which may be readily attached to and operated by a tractor or other vehicle of comparable power, for example, a bull-dozer, a mechanical shovel or a mobile crane, for the purpose of dislodging heavy objects such as boulders or tree stumps which may be partially embedded in the ground, and, in the preferred form of the device, lifting such objects and enabling them to be conveniently transported.

Accordingly the invention provides a transportable lifter comprising a beam adapted for attachment to a vehicle, a pivot adjacent one end of said beam, a cranked lever of the first order mounted on said pivot, a fulcrum block pivoted to said lever between said pivot and one end of the lever, and means for applying a turning force to the other end of said lever. The fulcrum block is adapted to rest on the ground when the toe of the cranked lever is in contact with the ground, so that the toe may be raised by depressing the heel of the lever. In order to permit this action to take place when the device is in use, the end of the beam on which the heel of the cranked lever is pivoted may be initially depressed. Preferably, however, the pivot of the lever is carried by a member or members articulated to the beam, in which case the height of the pivot above the ground surface may be varied without necessarily raising or lowering the end of the beam at which the pivot is supported. Advantageously the last mentioned end of the beam is supported directly upon wheels so that the device may readily be drawn or manipulated as desired by a tractor vehicle.

According to a further feature of the invention, the beam is provided at the end adjacent to the lever with a cam surface on which the back of the lever is adapted to roll while raising the toe portion of the lever. Said cam surface may be afforded by a roller.

In order to enable the device to be used also for raising objects to a greater height, for example for stacking or delivering such objects in an elevated position, according to a further feature of the invention the pivot of the lever may be connected to the beam through the intermediary of toggle link mechanism, said link mechanism preferably comprising an auxiliary lever, one end of which pivotally supports the cranked lever, while its other end is constrained to move longitudinally of the beam, an intermediate point of said auxiliary lever being pivotally connected by a link to the end of the beam adjacent to the bent lever, and means are provided for moving the end of said auxiliary lever remote from the cranked lever longitudinally of the beam.

The various features of the invention will be more readily understood from the following description with reference to the accompanying drawings which show a number of practical constructions, and wherein:

Fig. 1 is an elevation showing a simple form of the device according to the invention applied to a bull-dozer, Fig. 2 is a plan of Fig. 1, Figs. 3 and 4 are respectively an end elevation and plan of an alternative form which the lever may take, Figs. 5 and 6 are respectively a plan and elevation of a modified form of the device according to the invention.

Figs. 8 and 9 are respectively a plan and side elevation of a further modified form of the device according to the invention.

Corresponding parts are indicated by similar reference numerals in all the figures.

Figure 7:
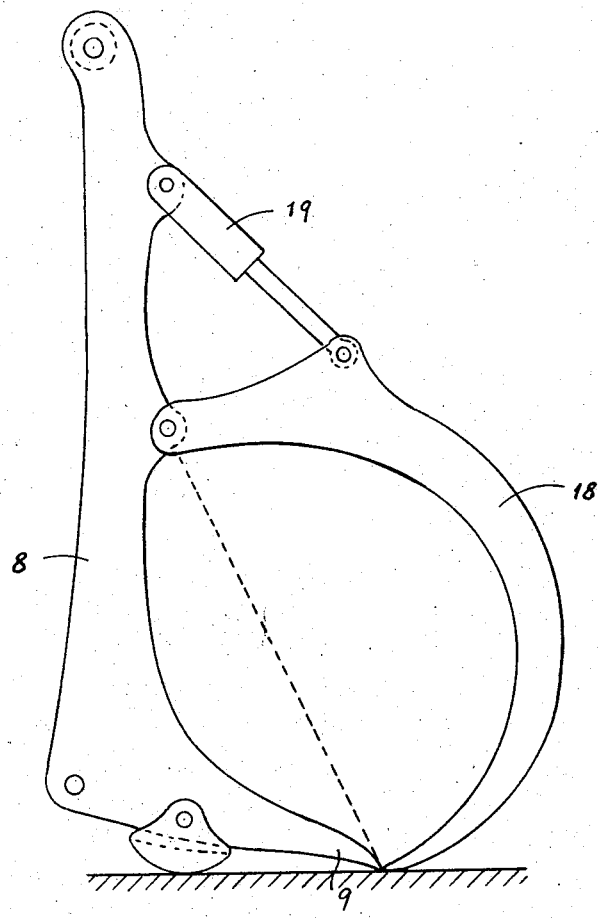
Fig. 7 shows a modified form of lever in side elevation.

Referring to Figs. 1 and 2 which show one arrangement for applying the invention to a bull-dozer, the dozer blade is removed and a beam in the form of a yoke 1 is pivoted at 2 to the frame of the dozer 3. Hydraulic cylinders 4 pivotally mounted at each side of the dozer are connected with the yoke 1 by rods 5 so that the yoke 1 can be moved pivotally about the pivot 2 by applying hydraulic pressure in the cylinders 4 to raise the free end of the yoke 1, said end descending under its own weight on releasing said pressure.

Near the free end of the yoke 1 is mounted the pivot 6 on which rests the heel 7 of the L-shaped lever 8. In the position of the lever shown in full lines in Fig. 1, the toe 9 of the lever extends forwardly and downwardly more or less in contact with the ground, and between the heel 7 and toe 9 a block 10, the broad lower surface of which is curved, is pivotally suspended. The block 10 is adapted to serve as a fulcrum for the lever 8 at certain times as hereinafter described.

The upwardly extruding arm 11 of the lever 8 has a pulley block 12 mounted thereon. A cable 13, one end of which is secured to the yoke 1, passes over the pulley block 12 and it attached to a winch 14 mounted on the dozer 3. A bar 15 hinged at one end to the yoke 1, extends towards the lever 8, carries a roller at its bifurcated upper end and is supported in an inclined position by a compression spring 17.

In operation the device to remove an obstruction such as a rock 20 (Fig. 1), the dozer is maneuvered so that with the free end of the yoke 1 held above the ground, the toe 9 of the lever 8 is inserted at the base of the obstruction. By slackening the cable 13 and simultaneously raising the free end of the yoke 1, the lever 8 may be tilted further than is shown in Fig. 1 so that, if desired, the toe 9 may point downwards at the greater angle and, on lowering the free end of the yoke may penetrate, or tend to penetrate, the ground surface, and may thus obtain a purchase beneath the obstruction. The hydraulic pressure in the cylinders 4 may now be relieved, whereupon the free end of the yoke 1 will tend to fall by its own weight and the weight of the lever 8, until the fulcrum block 10 rests upon the ground surface. If tension is now applied to the cable 13 by operating the winch 14 the lever 8 will tend to turn upon the fulcrum block 10. A powerful upward force may thus be applied at the toe 9 of the lever, the heel 7 of which is simultaneously depressed, the yoke 1 and lever 8 eventually being brought into the position A indicated by broken lines in Fig. 1 and causing the obstruction 20 to be displaced.

If desired, for example when being transported from place to place, the lever 8 may be tilted further towards the dozer 3, and in the position indicated in Fig. 1 by broken lines B may be resiliently supported by the bar 15, roller 16 and spring 17. The action of the spring 17 is to serve as a buffer for the lever 8 and to assist in raising the lever arm 11 when the tension on the cable 13 is relaxed.

In Figs. 1 and 2 the lever 8 is represented as having a narrow pointed toe 9 in the nature of a pick or crowbar. The lever 8 is, however, readily removable and replaceable by one of different formation, for example a scoop or shovel-shaped lever such as shown by way of example in Figs. 3 and 4. A further example is shown in Fig. 7, wherein the lever 8 carries a pivotal claw 18 operated by hydraulic cylinder 19 so that articles may be held between the toe 9 and claw 18, and so may be picked up and carried when the lever is turned into the positions indicated at A and B in Fig. 1. When the lever is shaped as a scoop or shovel it may be used for digging and raising materials in mass, for example, stones, sand, clay and so forth, in which case the claw member 18 is preferably shaped as a hood for the scoop, in which case the edges of the shovel shaped lever 8 and hood-shaped claw 18 may meet as indicated by broken line C in Fig. 7. The device may thus be used both as a shovel or grab and as a transporter or dumper if so desired.

While in Fig. 1, the lever 8 is shown as being carried on a beam in the form of a yoke 1, it is obvious that the form and arrangement of the beam may be widely varied within the scope of the invention. For example, the yoke normally provided on a bull-dozer to carry the dozer blade may be directly utilized to support the lever 8, the dozer blade being preferably removed and the pivot 6 for the lever 8 being mounted on said yoke at one side of the dozer. Any other mobile power appliance may be used in conjunction with the lever, provision being readily made for mounting the lever. For example, the jib of a mobile crane may have a pivot similar to the pivot 6 above described mounted at the free end of the jib to support the lever 8.

In the constructions hereinafter described with reference to Figs. 5, 6, 8 and 9 the beam 21 is arranged as a trailer for attachment to a tractor or other power unit (which may be of any well known type and is, therefore, not shown), and supported at the end adjacent to the lever 8 upon the axle 22 of wheels 23.

In the construction shown in Figs. 5 and 6, the lever 8 is not pivoted directly to the beam 21, but the pivot of the lever 8 is carried by a pair of arms 24 pivoted on the wheel axle 22. The arms 24 each have a tail piece 25 which forms an abutment for a compression spring 26 when the pivot 6 is depressed. In this example the cable 13 passing over pulleys 12 at the upper end of the lever 8 also runs over pulleys 27 mounted on the beam 21 before passing to the power unit, which is not shown in these figures.

In other respects the construction shown in Figs. 5 and 6 is similar to that described above with reference to Figs. 1 and 2. The provision of the articulated arms 24 permits the heel 7 of the lever 8 to be initially depressed when the lever 8 rocks on the fulcrum block 10 in raising a load on the toe 9, but on further tightening of the cable 13 to bring the lever into the position B indicated by broken lines, the back of the heel of the lever 8 runs upon a cam surface 28 formed on the end of the beam 21, the arms 24 also swinging upwards to permit such movement of the lever 8. If desired the cam surface 28 may be replaced by a roller.

Figure 9:
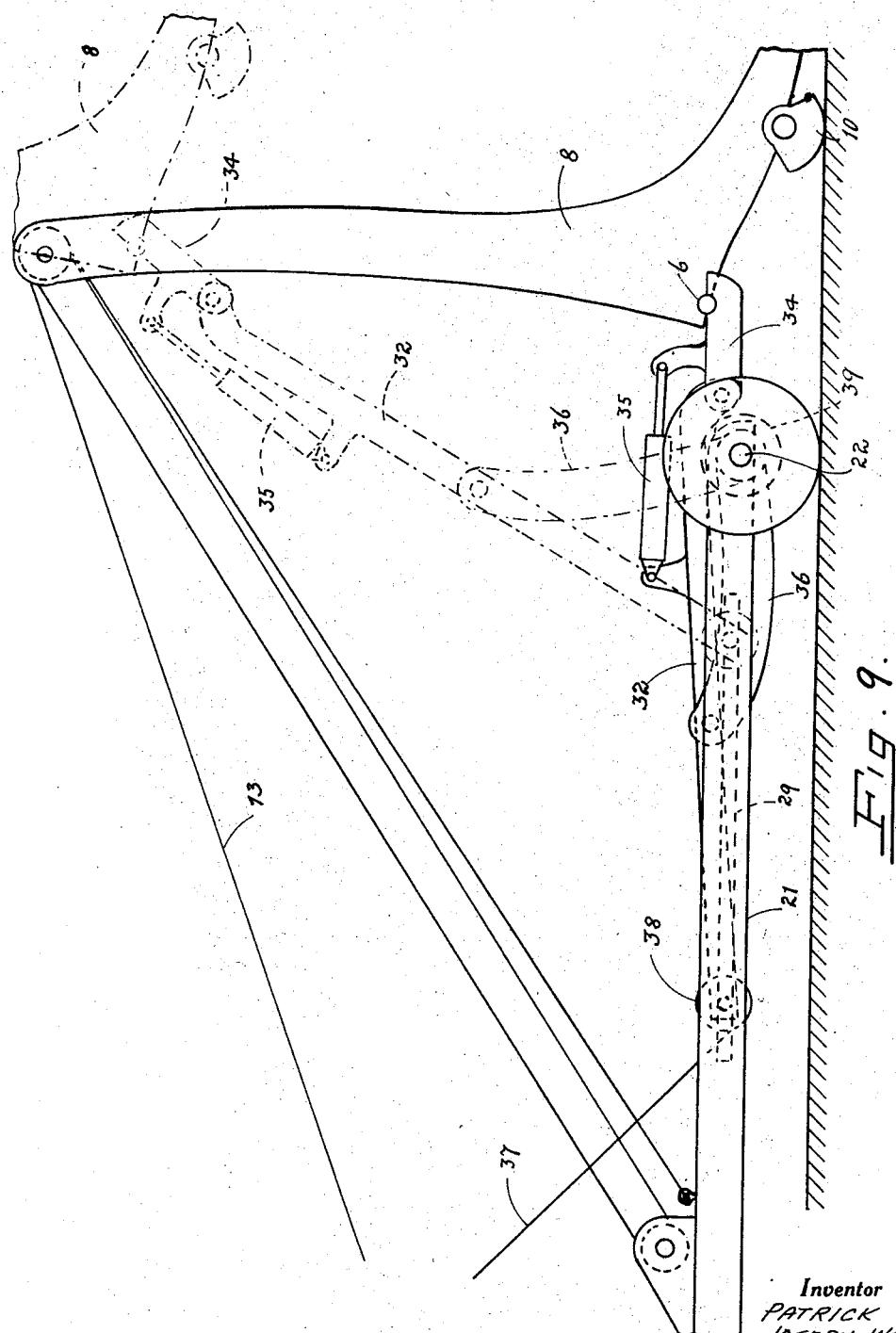

Figs. 8 and 9 show a further modification in which provision is made for raising the lever 8 bodily. In this construction the beam 21 is bifurcated and its two arms formed with slots 29 to receive guide rollers 30 carried by spindle 31 at one end of an auxiliary lever 32, the opposite end of which is forked and pivotally supports the arms 34 carrying the pivot 6 of the lever 8. The angular position of the arms 34 with respect to the auxiliary lever 32 is controlled by hydraulic cylinder devices 35 pivotally mounted between suitable points on said arms and auxiliary lever respectively.

A pair of pivotal links 36 connect a medial point on the auxiliary lever 32 with a point on the beam 21, conveniently the wheel axle 22. The auxiliary lever 32 and links 36 thus provide in effect a toggle mechanism, same being controlled by a cable 37 passing around pulleys 38 on the spindle 31, a pulley 39 on the axle 22 and finally to a winch on the power unit (not shown). Upon tensioning the cable 37 the spindle 31 is drawn towards the axle 22 the rollers 30 running in the guides 29, with the result that the end of the auxiliary lever 32 carrying the lever 8 is raised, for example as indicated by broken lines in Fig. 9. During operation of the cable 37 it may also be necessary or desirable to adjust the cable 13 in order to control the angular position of the lever 8.

It will be evident that with the device constructed as described with reference to Figs. 8 and 9, and especially if the lever 8 is provided with a claw 18 as shown in Fig. 7, it will be possible not only to dislodge, lift and transport using the lever 8 in the lower position represented in full lines in Fig. 9, but also to raise the lever 8 (as indicated by broken lines in Fig. 9), together with its load, to a convenient height above the beam 21, whereupon the load may be discharged if desired by opening the claw 18. Thus, the device may be used not only for dislodging and lifting obstructions or the like, but also for stacking, delivering into a truck, or even for unloading from a truck or raised platform.

In the foregoing description, the operation of the lever has been described as being effected by cables and winches or by hydraulic power, both of which are commonly used or provided for on bull-dozers and other power units employed in excavations and like heavy engineering work. It will be evident that the invention is not limited to the particular arrangement of operating cables and hydraulic cylinders described, but same may be varied or substituted one for the other as may be desired or found convenient in practice without departing from the invention.

I claim:

1. A transportable lifter comprising a beam, means at one end thereof for attaching said beam to a vehicle in a substantially horizontal position, a pivot adjacent the other end of the beam, means for moving said pivot substantially vertically with respect to the end of the beam remote therefrom, a cranked lever of the first order mounted on said pivot, a fulcrum block pivoted to said lever between said pivot and one end of the lever, and pulley means mounted on the other end of said lever.

2. A transportable lifter comprising a beam, means at one end thereof for attaching said beam to a vehicle in a substantially horizontal position, a wheeled support for the other end of said beam, a pivot adjacent the wheel-supported end of said beam, means for vertically raising and lowering the position of said pivot, a cranked lever of the first order mounted on said pivot, a fulcrum block pivoted to said lever between said pivot and one end of the lever, and pulley means mounted on the other end of said lever.

3. A transportable lifter comprising a beam, means at one end thereof for attaching said beam to a vehicle in a substantially horizontal position, a wheeled support for the other end of said beam, a pair of arms pivoted to the wheel-supported end of said beam, pivot means carried by said arms, a cranked lever of the first order mounted on said pivot means, a fulcrum block pivoted to said lever between said pivot means and one end thereof, and means for applying a turning force to the other end of said lever.

4. A transportable lifter comprising a beam, means at one end thereof for attaching said beam to a vehicle in a substantially horizontal position, a wheeled support for the other end of said beam, a pair of arms pivoted to the wheel-supported end of said beam, resilient abutment means for said arms, pivot means carried by said arms, a cranked lever of the first order mounted on said pivot means, a fulcrum block pivoted to said lever between said pivot means and one end thereof, and means for applying a turning force to the other end of said lever.

5. A transportable lifter comprising a beam, means at one end thereof for attaching said beam to a vehicle in a substantially horizontal position, a wheeled support for the other end of said beam, a pair of arms pivoted to the wheel-supported end of said beam, means for pivotally adjusting said arms, pivot means carried by said arms, a cranked lever of the first order mounted on said pivot means, a fulcrum block pivoted to said lever between said pivot means and one end thereof, a pulley mounted on the other end of said lever, a pulley mounted on the beam and a cable associated with said pulleys.

6. A transportable lifter comprising a beam, means at one end thereof for attaching said beam to a vehicle in a substantially horizontal position, a wheeled support for the other end of said beam, a pair of arms pivoted to the wheel-supported end of said beam, pivot means carried by said arms, a cranked lever of the first order mounted on said pivot means, a fulcrum block pivoted to said lever between said pivot means and one end thereof, a cam surface at the end of the beam adjacent to said lever and in proximity to the exterior angle of the lever adjacent to the pivot on the side thereof remote from the fulcrum block, and means for turning said lever into contact with said cam surface.

7. A transportable lifter comprising a beam, means for attaching one end thereof to a vehicle, wheels adjacent the other end of the beam for supporting the beam substantially horizontally, an elbowed lever having a pivot adjacent to its elbow, link means pivotally connecting said pivot to the beam adjacent to the wheel-supported end thereof, means operatively connected with said link means for raising and lowering said lever with respect to the beam, a fulcrum block pivoted to said lever between the elbow and one end thereof and means for applying a turning force to the other end of said lever.

References Cited in the file of this patent

UNITED STATES PATENTS

| | | |
|---|---|---|
| 2,693,650 | Struemph | Nov. 9, 1954 |
| 2,817,168 | Mullin | Dec. 24, 1957 |